US012677814B1

(12) United States Patent
Wu et al.

(10) Patent No.: US 12,677,814 B1
(45) Date of Patent: Jul. 14, 2026

(54) FISHING REEL AND FISHING TACKLE

(71) Applicant: Piscisea Tech Inc

(72) Inventors: Saier Wu, Shenzhen (CN); Binyao Tang, Hepu County (CN); Shengxu Cai, Shenzhen (CN); Chaoning Huang, Dongxing City (CN)

(73) Assignee: Piscisea Tech Inc, TX (US)

( * ) Notice: Subject to any disclaimer, the term of this patent is extended or adjusted under 35 U.S.C. 154(b) by 0 days.

(21) Appl. No.: 19/339,230

(22) Filed: Sep. 24, 2025

(30) Foreign Application Priority Data

Jul. 30, 2025 (CN) .......................... 202511055276.4

(51) Int. Cl.
*A01K 89/017* (2006.01)
*A01K 89/015* (2006.01)

(52) U.S. Cl.
CPC ...... *A01K 89/017* (2013.01); *A01K 89/01931* (2015.05)

(58) Field of Classification Search
CPC ......................... A01K 89/017; A01K 89/01931
USPC .............................................................. 43/21
See application file for complete search history.

(56) References Cited

U.S. PATENT DOCUMENTS

| | | | | |
|---|---|---|---|---|
| 4,598,878 A * | 7/1986 | Steffan | ................. | A01K 89/017 |
| | | | | 242/263 |
| 8,770,504 B1 * | 7/2014 | Sandstrom | ........... | A01K 89/017 |
| | | | | 242/225 |
| 10,039,273 B2 * | 8/2018 | Niitsuma | ......... | A01K 89/01556 |
| 2012/0318902 A1 * | 12/2012 | Kawabe | ............... | A01K 89/057 |
| | | | | 242/298 |
| 2017/0280697 A1 * | 10/2017 | Nonogaki | .............. | H02K 5/203 |
| 2024/0298625 A1 * | 9/2024 | Gongwer | ........... | A01K 89/0184 |
| 2026/0041076 A1 * | 2/2026 | Wei | ....................... | A01K 89/017 |

FOREIGN PATENT DOCUMENTS

| | | | | | |
|---|---|---|---|---|---|
| CN | 107258719 A | * | 10/2017 | ......... | A01K 89/017 |
| CN | 111616117 A | * | 9/2020 | ............. | A01K 89/02 |
| GB | 2478200 A | * | 8/2011 | ............. | A01K 91/02 |
| KR | 102374340 B1 | * | 3/2022 | ............... | H02K 7/14 |
| KR | 20240030023 A | * | 3/2024 | ......... | A01K 89/0176 |
| KR | 20250096543 A | * | 6/2025 | ......... | A01K 89/0183 |

* cited by examiner

*Primary Examiner* — Christopher P Ellis

(57) ABSTRACT

A fishing reel and a fishing tackle are provided. The fishing reel includes: a line spooler, configured to unwind or wind a fishing line; a linkage device, configured to be coupled to or decoupled from the line spooler; a drive device, configured to drive the linkage device such that the line spooler rotates; a line guide, configured to enable the fishing line to pass therethrough and guide the fishing line; and a leading shaft, configured to guide the line guide to perform a linear reciprocating motion. The drive device includes a manual drive module and an electric drive module, and at least one selected from the manual drive module and the electric drive module serves as a drive source. The leading shaft is in transmission connection with the linkage device. The fishing reel has three drive modes, and achieves uniform winding of the fishing line.

10 Claims, 7 Drawing Sheets

FISHING REEL AND FISHING TACKLE

CROSS REFERENCE TO RELATED APPLICATIONS

The present application claims the right of priority for Chinese Patent Application No. 2025110552764, filed to the China National Intellectual Property Administration on Jul. 30, 2025, which is incorporated herein by reference in its entirety.

TECHNICAL FIELD

The present disclosure relates to the technical field of fishing tackles, and in particular to a fishing reel and a fishing tackle.

BACKGROUND

A fishing reel, also known as a fishing line wheel, is one of the commonly used fishing tackles for rod-casting fishing. A fishing reel of the prior art is mainly manually driven, which relies on manual rotation of a rocker arm by an angler to actuate a transmission system of the fishing reel, so as to achieve release and retrieval of the fishing line.

Such fishing reels have a relatively simple structure and low cost, but exhibit obvious limitations in actual use: when the angler needs line retrieval after catching a large fish or needs to achieve fast line retrieval, the angler needs to continuously apply a large force, resulting in that the angler easily feels fatigued, thereby affecting the continuity and success rate of fishing. Additionally, during line retrieval of a fishing reel of the prior art, uniform winding of the fishing line cannot be achieved, and problems such as line tangling, difficult line retrieval, and the like easily occur.

SUMMARY

In order to overcome the deficiencies and solve the problems in the prior art, the present disclosure provides a fishing reel and a fishing tackle.

To solve the above problems, in a first aspect, a fishing reel is provided in an embodiment of the present disclosure, including:

a line spooler, configured to unwind or wind the fishing line;

a linkage device, configured to be coupled to or decoupled from the line spooler;

a drive device, configured to drive the linkage device such that the line spooler coupled to the linkage device rotates;

a line guide, configured to enable the fishing line to pass therethrough and guide the fishing line; and a leading shaft, configured to guide the line guide to perform a linear reciprocating motion;

where the drive device includes a manual drive module and an electric drive module, and at least one selected from the manual drive module and the electric drive module serves as a drive source; and the leading shaft is in transmission connection with the linkage device.

In a possible embodiment, the line spooler includes a first mounting portion and a second mounting portion, where the first mounting portion is fixedly provided with a first fixed friction member, and the second mounting portion is fixedly provided with a second fixed friction member;

the linkage device includes a mounting shaft, a first driven friction member, and a second driven friction member;

the mounting shaft extends through the line spooler; and the first driven friction member and the second driven friction member are both sleeved on the mounting shaft, the first driven friction member is fixedly connected to the mounting shaft, and the second driven friction member is connected to the mounting shaft in a synchronously rotatable and slidable manner;

the first driven friction member is configured to move synchronously with the mounting shaft so as to come into contact with or disengage from the first fixed friction member; the second driven friction member is configured to come into contact with or disengage from the second fixed friction member when the line spooler moves relative to a housing of the fishing reel under the action of the linkage device;

when the linkage device is coupled to the line spooler: the first driven friction member comes into contact with the first fixed friction member; or the first driven friction member comes into contact with the first fixed friction member, and the second driven friction member comes into contact with the second fixed friction member; and when the linkage device is decoupled from the line spooler: the first driven friction member disengages from the first fixed friction member, and the second driven friction member disengages from the second fixed friction member.

In a possible embodiment, the linkage device is connected to a first reset member and a second reset member; wherein the first reset member is configured to provide a first reset force so as to drive the first driven friction member to disengage from the first fixed friction member; and the second reset member is configured to provide a second reset force so as to drive the second driven friction member to disengage from the second fixed friction member.

In a possible embodiment, an adjustment device is disposed on the housing of the fishing reel; the adjustment device is configured to drive the mounting shaft to translate in a preset direction, such that the linkage device is coupled to or decoupled from the line spooler; and the preset direction is an axial direction of the mounting shaft.

In a possible embodiment, the adjustment device includes a shift lever, a base, and a sleeve ring;

a housing sleeve of the shift lever is sleeved on the sleeve ring, and the housing sleeve is connected to the sleeve ring in a synchronously rotatable manner;

the base is slidably disposed on the housing of the fishing reel, and a sliding direction of the base relative to the housing of the fishing reel is consistent with the axial direction of the mounting shaft; a boss of the base is provided with a placement hole, a pin shaft is fixedly mounted in the placement hole, and a portion of the pin shaft is located outside the placement hole; one end of the mounting shaft is connected to the base; and the sleeve ring is rotatably sleeved on the boss of the base; the sleeve ring is provided with a guide structure; and the guide structure is configured to drive the pin shaft to translate in a direction parallel to the axial direction of the mounting shaft when the sleeve ring rotates.

In a possible embodiment, the sleeve ring includes a first end face and a second end face, and the first end face and the second end face are disposed at two axial ends of the sleeve ring respectively; the first end face is farther from the line spooler than the second end face; and the guide structure includes a guide surface, and the guide surface abuts against the pin shaft; and in the axial direction of the mounting shaft, a distance between the guide surface and the line spooler gradually increases from a proximal end to a distal end of the guide surface, where the proximal end of the guide surface is connected to the first end face.

In a possible embodiment, the adjustment device further includes a knob, and the knob is threadedly connected to the base; a fixed bearing is disposed within the knob, and an inner ring of the fixed bearing is fixedly connected to the mounting shaft; and the housing sleeve, the base, the sleeve ring, the fixed bearing, and the mounting shaft are all coaxially arranged.

In a possible embodiment, the line guide is provided with a threading hole, and the threading hole is configured to enable the fishing line to pass therethrough;

the line guide includes a first mounting hole and a second mounting hole; a guide shaft extends through the first mounting hole, and the line guide is slidably connected to the first mounting hole; the leading shaft extends through the second mounting hole, and the leading shaft is slidably connected to the second mounting hole; and the guide shaft and the leading shaft are arranged parallel to each other;

the leading shaft is provided with two intersecting helical grooves; proximal ends of the two helical grooves are communicated with each other, and distal ends thereof are also communicated with each other; and the line guide is provided with a pin; the pin is inserted into the helical groove; and the pin is configured to slide along the helical groove when the leading shaft rotates.

In a possible embodiment, the fishing reel further includes a detection module and a display module;

where the detection module is configured to detect a rotational speed and/or the rotation count of the leading shaft; and the display module is configured to display operating parameters of the fishing reel, wherein the display module is electrically connected to the detection module.

In a second aspect, a fishing tackle is provided in an embodiment of the present disclosure, including a fishing rod and the fishing reel mentioned above, where the fishing reel is mounted on the fishing rod.

The present disclosure has the following beneficial effects:

The fishing reel provided in the present disclosure includes the line spooler, the linkage device, the drive device, the line guide, and the leading shaft. When the linkage device is coupled to the line spooler, the drive device drives the linkage device, such that the line spooler rotates, thereby achieving the unwinding or winding of the fishing line. Since the leading shaft is in transmission connection with the linkage device, during winding of the fishing line, the leading shaft rotates and guides the line guide to perform a linear reciprocating motion in an axial direction of the leading shaft; and in this way, under the action of the line guide, the fishing line is uniformly wound on the line spooler, thereby solving the problems of line tangling, difficult line retrieval, and the like that occur during the line retrieval process.

In the present disclosure, the drive device includes a manual drive module and an electric drive module, and at least one selected from the manual drive module and the electric drive module serves as a drive source. In this way, during use, a user may select the manual drive module and/or the electric drive module according to needs to drive the linkage device. It can be seen that three drive modes are provided for the drive device: the manual drive mode, the electric drive mode, and a hybrid manual-electric drive mode; and therefore, the user may select a corresponding drive mode according to actual conditions.

The fishing reel has at least the following advantages: three drive modes are provided; and uniform winding of the fishing line may be achieved.

BRIEF DESCRIPTION OF THE DRAWINGS

To describe the technical solution in the embodiments of the present disclosure more clearly, the accompanying drawings required for describing the embodiments are briefly described below. It is to be understood that the following accompanying drawings show merely some embodiments of the present disclosure, and therefore it is not to be construed as a limitation to the scope. Those of ordinary skill in the art can also derive other accompanying drawings from these accompanying drawings without making inventive efforts.

REFERENCE NUMERALS IN THE FIGURES

Figures 1, 2:
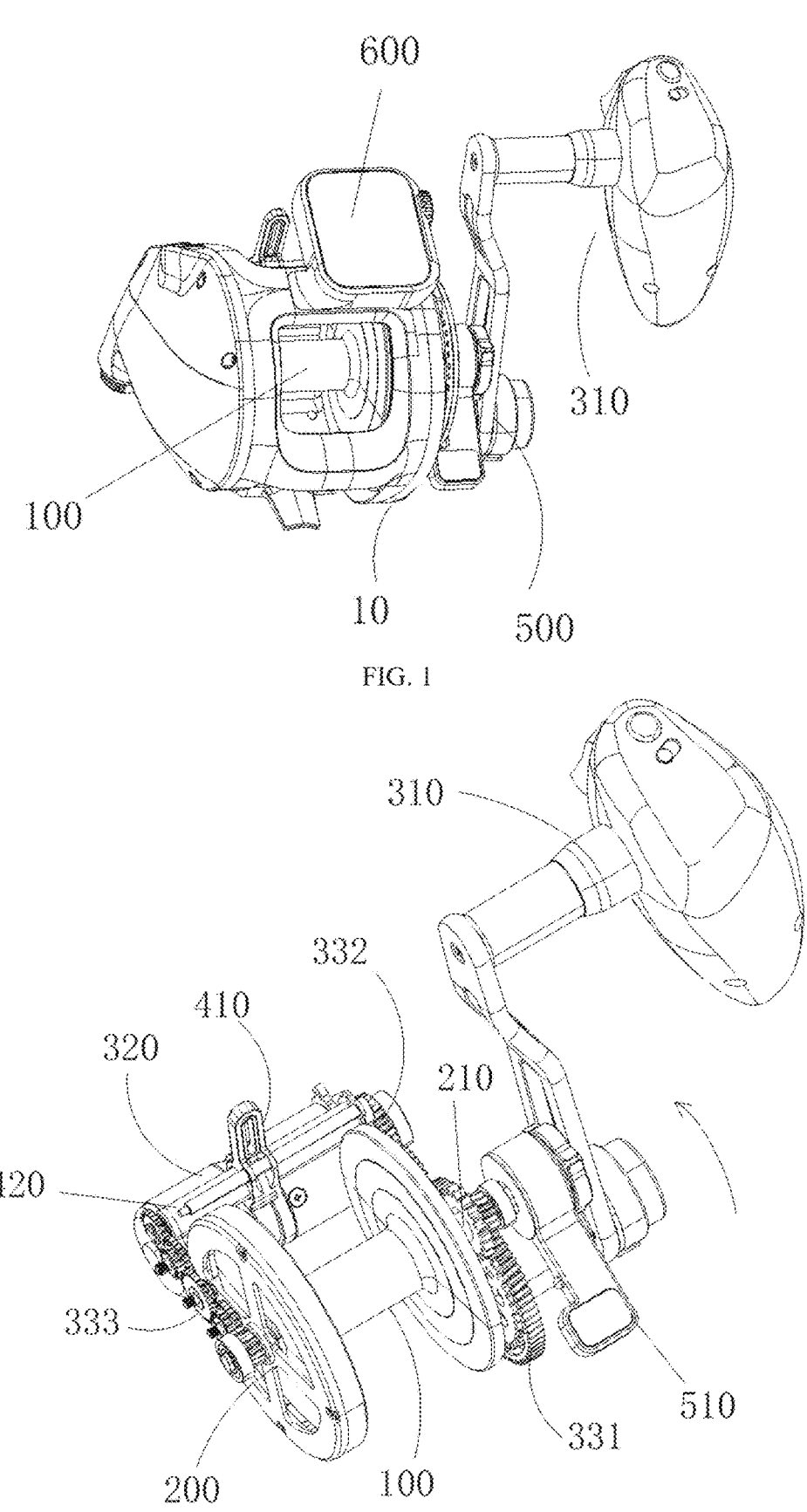
FIG. 1 is an overall schematic diagram of a fishing reel.
FIG. 2 is a first schematic diagram of a rocker arm, a motor, and a line spooler in an assembled state.

10—housing; 100—line spooler; 110—first mounting portion; 111—first fixed friction member; 120—second mounting portion; 121—second fixed friction member; 131—first connecting bearing; 132—second connecting bearing; 200—linkage device; 210—mounting shaft; 220—first driven friction member; 230—second driven friction member; 241—first reset member; 242—second reset member; 310—manual drive module; 320—electric drive module; 331—first gear transmission mechanism; 332—second gear transmission mechanism; 333—third gear transmission mechanism; 410—line guide; 411—threading hole; 412—first mounting hole; 413—second mounting hole; 414—open hole; 420—leading shaft; 421—first helical groove; 422—second helical groove; 430—guide shaft; 500—adjustment device; 510—shift lever; 511—housing sleeve; 520—base; 521—boss; 522—placement hole; 523—pin shaft; 530—sleeve ring; 531—guide structure; 532—first end face; 533—second end face; 540—knob; 541—end cover; 550—fixed bearing; and 600—display module.

DETAILED DESCRIPTIONS OF THE EMBODIMENTS

Embodiments of the present disclosure are described in detail below, and examples of the embodiments are shown in accompanying drawings, throughout which identical or similar reference numerals denote identical or similar elements or elements having identical or similar functions. The embodiments described with reference to the accompanying drawings are exemplary and only intended to explain the present disclosure, instead of being construed as limiting the present disclosure.

In the description of the present disclosure, it should be understood that the terms "center", "longitudinal", "lateral", "length", "width", "thickness", "upper", "lower", "front", "rear", "left", "right", "vertical", "horizontal", "top", "bottom", "inner", "outer", "clockwise", "counterclockwise", "axial", "radial", "circumferential", etc. indicate azimuthal or positional relations based on those shown in the accompanying drawings only for ease of description of the present disclosure and for simplicity of description, and are not intended to indicate or imply that the referenced device or element must have a particular orientation and be constructed and operative in a particular orientation, and thus may not be interpreted as a limitation on the present disclosure.

In the present disclosure, "unwinding" refers to an operation of gradually releasing and unfolding a fishing line wound on a line spooler from the line spooler; and "winding" refers to an operation of winding the fishing line on the line spooler.

EMBODIMENT

With reference to FIGS. 1-4, a fishing reel is provided in this embodiment, including:

- a line spooler 100, configured to unwind or wind the fishing line;
- a linkage device 200, configured to be coupled to or decoupled from the line spooler 100;
- a drive device, configured to drive the linkage device 200 such that the line spooler 100 coupled to the linkage device 200 rotates;
- a line guide 410, configured to enable the fishing line to pass therethrough and guide the fishing line; and
- a leading shaft 420, configured to guide the line guide 410 to perform a linear reciprocating motion.

The drive device includes a manual drive module 310 and an electric drive module 320, and at least one selected from the manual drive module 310 and the electric drive module 320 serves as a drive source. The leading shaft 420 is in transmission connection with the linkage device 200.

When the linkage device 200 is coupled to the line spooler 100, the drive device drives the linkage device 200, such that the line spooler 100 rotates, thereby achieving the unwinding or winding of the fishing line. Since the leading shaft 420 is in transmission connection with the linkage device 200, during winding of the fishing line, the leading shaft 420 rotates and guides the line guide 410 to perform a linear reciprocating motion in an axial direction of the leading shaft 420; and in this way, under the action of the line guide 410, the fishing line is uniformly wound on the line spooler 100, thereby solving the problems of line tangling, difficult line retrieval, and the like that occur during the line retrieval process. The leading shaft 420 is arranged parallel to a rotation axis of the line spooler 100.

The drive device includes a manual drive module 310 and an electric drive module 320, and at least one selected from the manual drive module 310 and the electric drive module 320 serves as a drive source. In this way, during use, a user may select the manual drive module 310 and/or the electric drive module 320 according to needs to drive the linkage device 200. It can be seen that three drive modes are provided for the drive device: the manual drive mode, the electric drive mode, and a hybrid manual-electric drive mode; and therefore, the user may select a corresponding drive mode according to actual conditions. In the hybrid manual-electric drive mode, the electric drive module 320 provides assistance, such that the user completes the line retrieval operation more easily and controllably.

Figure 3:
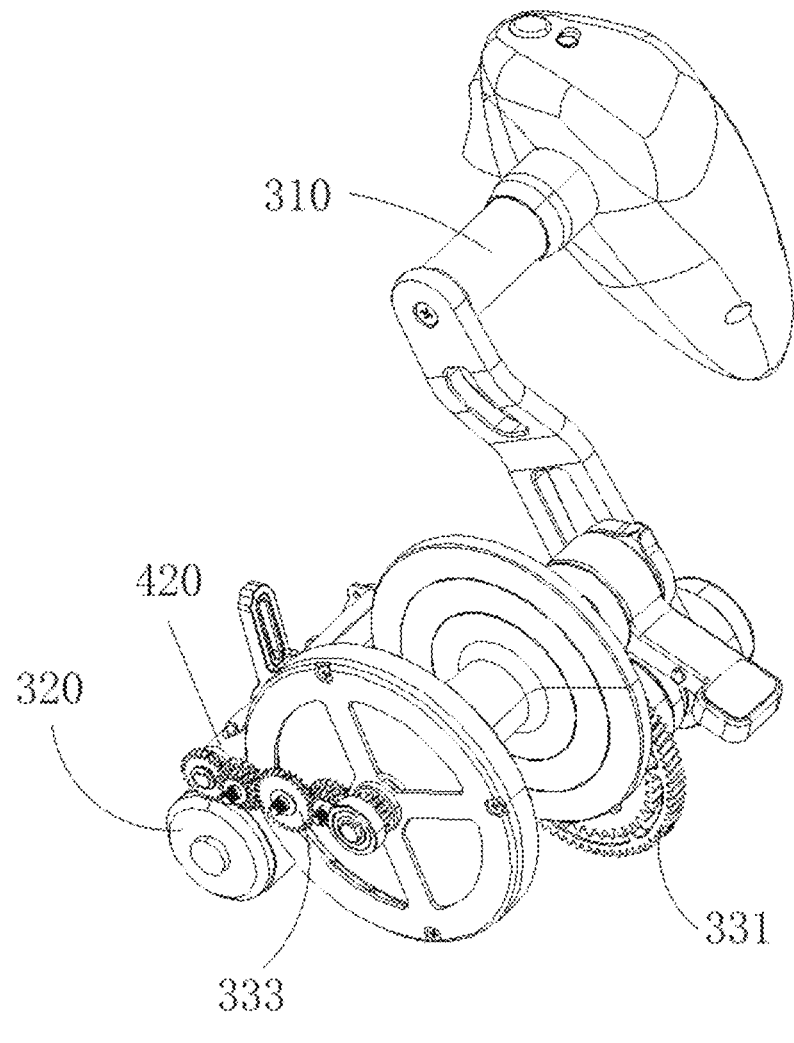
FIG. 3 is a second schematic diagram of FIG. 2.
Figure 4:
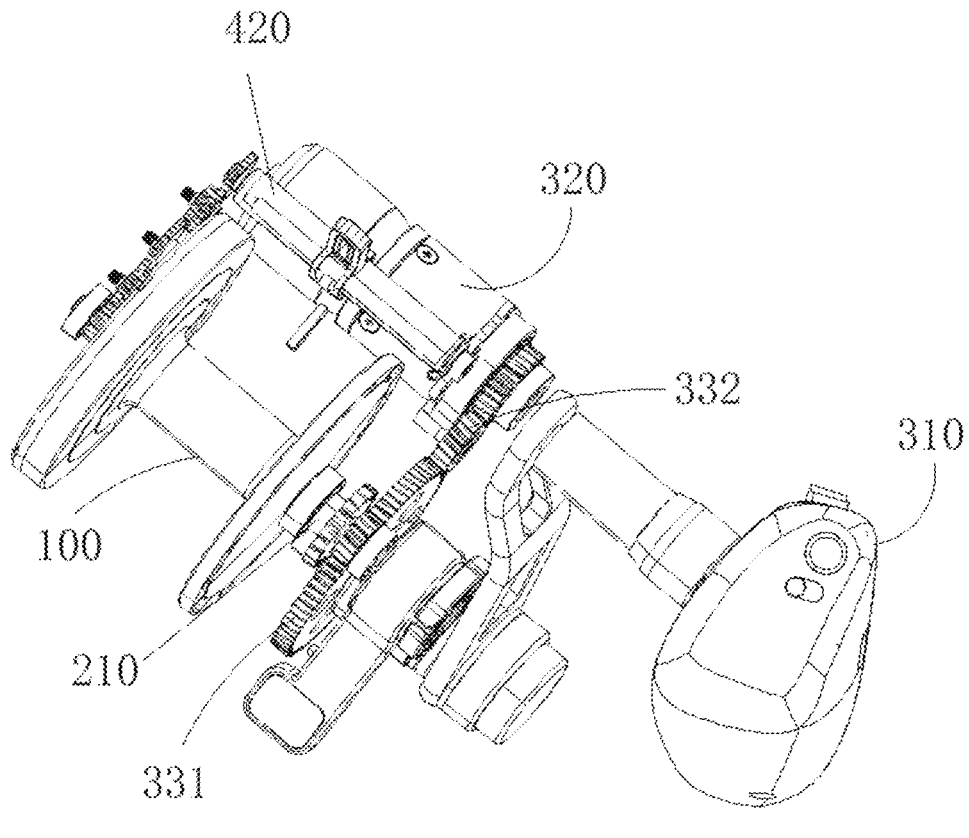
FIG. 4 is a third schematic diagram of FIG. 3.

As shown in FIGS. 2-4, the manual drive module 310 includes a rocker arm, and the electric drive module 320 includes a motor, where the rocker arm is in transmission connection with a mounting shaft 210 of the linkage device 200 through a first gear transmission mechanism 331, the motor is in transmission connection with the mounting shaft 210 of the linkage device 200 through a second gear transmission mechanism 332, and an end of the mounting shaft 210 away from the rocker arm is in transmission connection with the leading shaft 420 through a third gear transmission mechanism 333. FIGS. 2-4 are all schematic diagrams illustrating the first gear transmission mechanism 331, the second gear transmission mechanism 332, and the third gear transmission mechanism 333 respectively, and in an actual manufacturing process, specific configurations thereof may be adjusted based on specifications and quantities of gears in each of the gear transmission mechanisms to meet specific transmission requirements.

Figure 5:
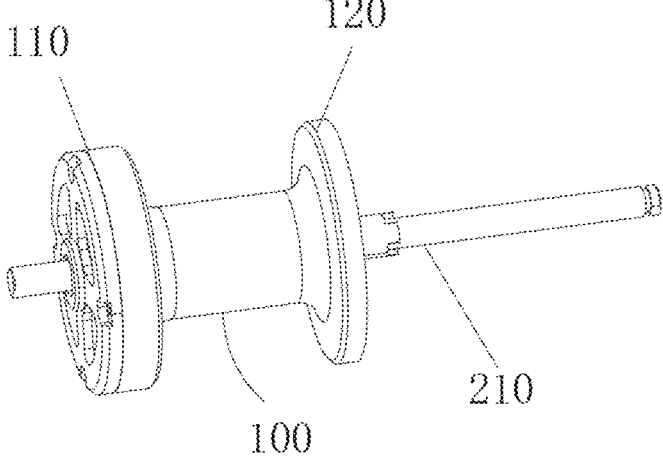
FIG. 5 is a schematic diagram of a line spooler and a linkage device in an assembled state.
Figure 6:
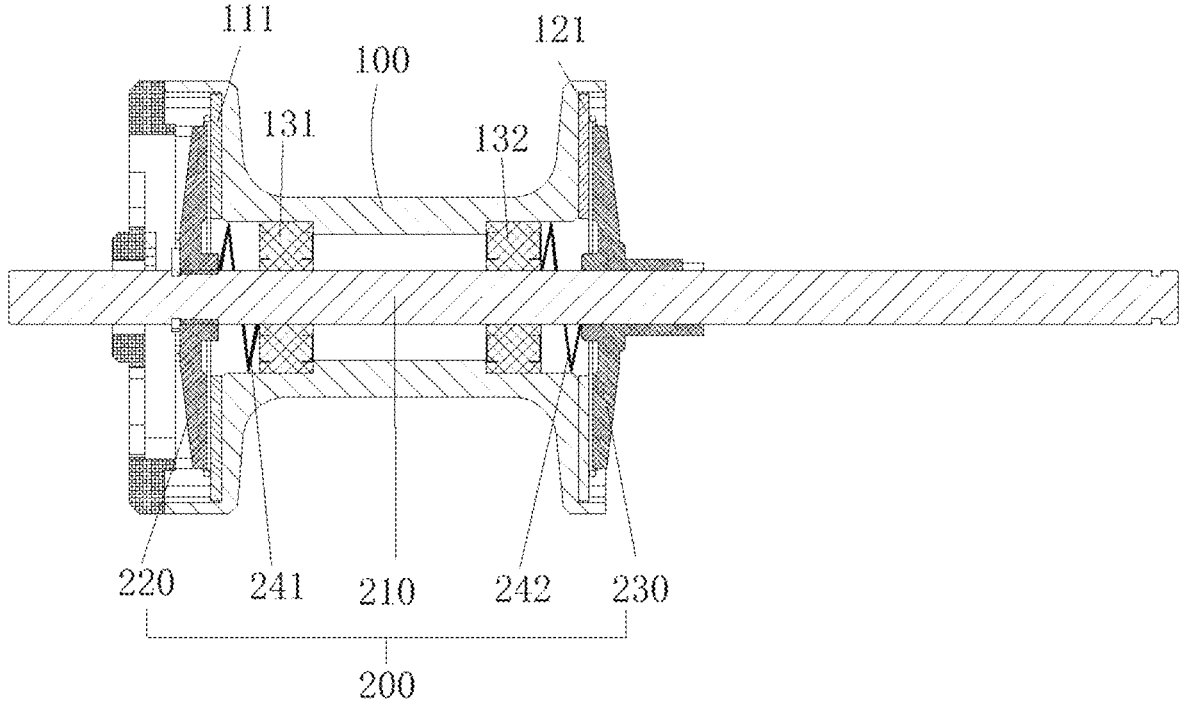
FIG. 6 is a sectional view of FIG. 5.

As shown in FIGS. 5 and 6, in this embodiment, the line spooler 100 includes a first mounting portion 110 and a second mounting portion 120, where the first mounting portion 110 is fixedly provided with a first fixed friction member 111, and the second mounting portion 120 is fixedly provided with a second fixed friction member 121.

The linkage device 200 includes the mounting shaft 210, a first driven friction member 220, and a second driven friction member 230; the mounting shaft 210 extends through the line spooler 100; and the first driven friction member 220 and the second driven friction member 230 are both sleeved on the mounting shaft 210, the first driven friction member 220 is fixedly connected to the mounting shaft 210, and the second driven friction member 230 is connected to the mounting shaft 210 in a synchronously rotatable and slidable manner. The line spooler 100 and the mounting shaft 210 are arranged coaxially, and the line spooler 100 is sleeved on the mounting shaft 210.

The first driven friction member 220 and the mounting shaft 210 may be fixedly connected through interference fit or other means. A portion where the mounting shaft 210 is connected to the second driven friction member 230 is a connection segment, the second driven friction member 230 is provided with a non-circular connecting hole, and a cross-sectional shape of the connection segment corresponds to that of the connecting hole, where the connection segment and the connecting hole may be in clearance fit with each other.

The first fixed friction member 111, the second fixed friction member 121, the first driven friction member 220, and the second driven friction member 230 may all employ friction discs or friction plates.

The first driven friction member 220 is configured to move synchronously with the mounting shaft 210 so as to come into contact with or disengage from the first fixed friction member 111. The second driven friction member 230 is configured to come into contact with or disengage from the second fixed friction member 121 when the line spooler 100 moves relative to a housing 10 of the fishing reel under the action of the linkage device 200.

When the linkage device 200 is coupled to the line spooler 100: the first driven friction member 220 comes into contact with the first fixed friction member 111; or the first driven friction member 220 comes into contact with the first fixed friction member 111, and the second driven friction member 230 comes into contact with the second fixed friction member 121.

When the linkage device 200 is decoupled from the line spooler 100: the first driven friction member 220 disengages from the first fixed friction member 111, and the second driven friction member 230 disengages from the second fixed friction member 121. That is, the first driven friction member 220 does not come into contact with the first fixed friction member 111, and the second driven friction member 230 does not come into contact with the second fixed friction member 121. In the decoupled state, the line spooler 100 and the linkage device 200 may rotate independently relative to each other (i.e., when the line spooler 100 rotates, the line spooler 100 does not drive the linkage device 200 to rotate; and when the linkage device 200 rotates, the linkage device 200 does not drive the line spooler 100 to rotate).

When the linkage device 200 is coupled to the line spooler 100, rotating the rocker arm and/or actuating the motor enables to drive the mounting shaft 210 to rotate through the first gear transmission mechanism 331 and/or the second gear transmission mechanism 332. When the mounting shaft 210 rotates, the first driven friction member 220 and the second driven friction member 230 rotate accordingly; and in this case, a friction is generated between the first driven friction member 220 and the first fixed friction member 111; or a friction is generated between the first driven friction member 220 and the first fixed friction member 111, and a friction is generated between the second driven friction member 230 and the second fixed friction member 121. Since both the first fixed friction member 111 and the second fixed friction member 121 are fixedly connected to the line spooler 100, the line spooler 100 rotates under the action of a friction, thereby achieving the winding or unwinding of the fishing line. Additionally, during the rotation of the mounting shaft 210, the third gear transmission mechanism 333 drives the leading shaft 420 to rotate, thereby driving the line guide 410 to perform a linear reciprocating motion.

With reference to FIG. 6, in an initial state of the fishing reel, the linkage device 200 is decoupled from the line spooler 100, in this case, there is a gap between the first driven friction member 220 and the first fixed friction member 111, and there is a gap between the second driven friction member 230 and the second fixed friction member 121; when the user drives the mounting shaft 210 to translate rightward for a first distance, the first driven friction member 220 comes into contact with the first fixed friction member 111, and in this case, a normal force exists between the first driven friction member 220 and the first fixed friction member 111, where when the mounting shaft 210 rotates, a friction is generated between the first driven friction member 220 and the first fixed friction member 111, thereby driving the line spooler 100 to rotate; and when the user further drives the mounting shaft 210 to translate rightward for a second distance, the normal force between the first driven friction member 220 and the first fixed friction member 111 increases, and during this process, the first driven friction member 220 squeezes the first fixed friction member 111 and thereby drives the line spooler 100 to translate rightward relative to the housing 10 of the fishing reel (the line spooler 100 has access to a certain movable space relative to the housing 10 of the fishing reel in an axial direction of the mounting shaft 210), such that the second fixed friction member 121 comes into contact with the second driven friction member 230, and in this case, a normal force exists between the second driven friction member 230 and the second fixed friction member 121.

It can be seen that when the line spooler 100 and the mounting shaft 210 rotate relative to each other or tend to rotate relative to each other, the normal force between the first driven friction member 220 and the first fixed friction member 111 and the normal force between the second driven friction member 230 and the second fixed friction member 121 may be changed by controlling a translation distance of the mounting shaft 210, to achieve the adjustment of the friction between the first driven friction member 220 and the first fixed friction member 111, and/or the friction between the second driven friction member 230 and the second fixed friction member 121. For example, when a lightweight fish is hooked, the friction may be reduced; and when a heavy fish is hooked, the friction may be increased.

Take the case that the first driven friction member 220 is in contact with the first fixed friction member 111 for illustration. When a fish is hooked, the fish instinctively pulls the fishing line, and accordingly, the fishing line may drive the line spooler 100 to rotate, such that the fishing line is unwound; and during this process, the line spooler 100 rotates relative to the mounting shaft 210, and accordingly, the first driven friction member 220 and the first fixed friction member 111 rotate relative to each other, such that a sliding friction is generated between the first driven friction member 220 and the first fixed friction member 111. By controlling the translation distance of the mounting shaft 210, magnitudes of a pair of normal forces interacting with each other between the first driven friction member 220 and the first fixed friction member 111 may be changed, and then a magnitude of the sliding friction between the first driven friction member 220 and the first fixed friction member 111 and/or a magnitude of the sliding friction between the second driven friction member 230 and the second fixed friction member 121 may be further changed, to achieve the adjustment of a line release speed of the fishing line. With reference to FIG. 6, when necessary to increase the line release speed, the mounting shaft 210 is controlled to translate leftward relative to the line spooler 100; and when necessary to reduce the line release speed, the mounting shaft 210 is controlled to translate rightward relative to the line spooler 100, where after the mounting shaft 210 moves for a certain distance, the second driven friction member 230 comes into contact with the second fixed friction member 121.

A limiting structure is arranged in the housing 10, and the limiting structure is configured to abut against the second driven friction member 230. When the second driven friction member 230 is pressed by the second fixed friction member 121, the limiting structure abuts against the second driven friction member 230 to prevent the second driven friction member 230 from further moving rightward, thereby ensuring that the second fixed friction member 121 and the second driven friction member 230 remain contact with each other.

As shown in FIG. 6, the linkage device 200 is connected to a first reset member 241 and a second reset member 242. The first reset member 241 is configured to provide a first reset force so as to drive the first driven friction member 220 to disengage from the first fixed friction member 111; and the second reset member 242 is configured to provide a second reset force so as to drive the second driven friction member 230 to disengage from the second fixed friction member 121.

Both the first reset member 241 and the second reset member 242 have elasticity. In this embodiment, both the first reset member 241 and the second reset member 242 employ springs, and are sleeved on the mounting shaft 210.

As shown in FIG. 6, a first connecting bearing 131 and a second connecting bearing 132 are fixedly disposed in the line spooler 100, the mounting shaft 210 extends through the first connecting bearing 131 and the second connecting bearing 132, and the mounting shaft 210 is in clearance fit with both the first connecting bearing 131 and the second connecting bearing 132, such that the mounting shaft 210 may slide relative to both the first connecting bearing 131 and the second connecting bearing 132. The first reset member 241 is disposed between the first driven friction member 220 and the first connecting bearing 131, and the first driven friction member 220 and the first connecting bearing 131 abut against two ends of the first reset member 241 respectively; and the second reset member 242 is disposed between the second driven friction member 230 and the second connecting bearing 132, and the second driven friction member 230 and the second connecting bearing 132 abut against two ends of the second reset member 242 respectively. The first fixed friction member 111 is located between the first driven friction member 220 and the first connecting bearing 131, and the second fixed friction member 121 is located between the second driven friction member 230 and the second connecting bearing 132.

When the linkage device 200 is decoupled from the line spooler 100, under the action of the first reset member 241 and the second reset member 242, the first driven friction member 220 is not in contact with the first fixed friction member 111, and the second driven friction member 230 is not in contact with the second fixed friction member 121; and when the linkage device 200 is coupled to the line spooler 100, both the first reset member 241 and the second reset member 242 are in a compressed state.

As shown in FIG. 1, in this embodiment, an adjustment device 500 is disposed on the housing 10 of the fishing reel. The adjustment device 500 is configured to drive the mounting shaft 210 to translate in a preset direction, such that the linkage device 200 is coupled to or decoupled from the line spooler 100. The preset direction is an axial direction of the mounting shaft 210.

Figure 7:
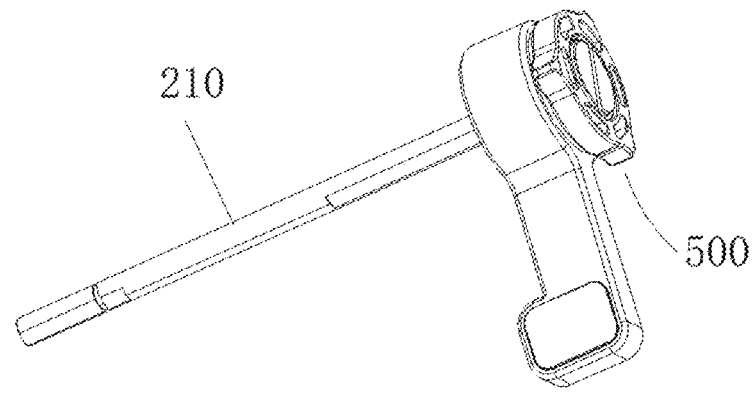
FIG. 7 is a schematic diagram of connection between a mounting shaft and an adjustment device.
Figure 8:
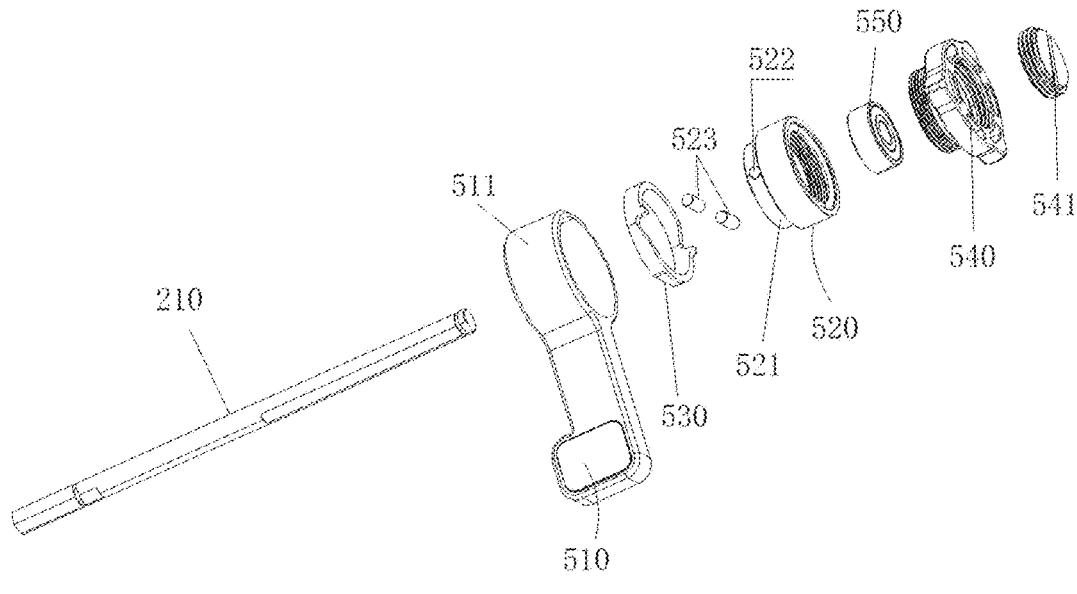
FIG. 8 is an exploded view of FIG. 7.

As shown in FIGS. 7 and 8, the adjustment device 500 includes a shift lever 510, a base 520, and a sleeve ring 530.

A housing sleeve 511 of the shift lever 510 is sleeved on the sleeve ring 530, and the housing sleeve 511 is connected to the sleeve ring 530 in a synchronously rotatable manner.

The base 520 is slidably disposed on the housing 10 of the fishing reel, and a sliding direction of the base 520 relative to the housing 10 of the fishing reel is consistent with the axial direction of the mounting shaft 210. A boss 521 of the base 520 is provided with a placement hole 522, a pin shaft 523 is fixedly mounted in the placement hole 522, and a portion of the pin shaft 523 is located outside the placement hole 522. One end of the mounting shaft 210 is connected to the base 520.

The sleeve ring 530 is rotatably sleeved on the boss 521 of the base 520. The sleeve ring 530 is provided with a guide structure 531. The guide structure 531 is configured to drive the pin shaft 523 to translate in a direction parallel to the axial direction of the mounting shaft 210 when the sleeve ring 530 rotates.

Figure 9:
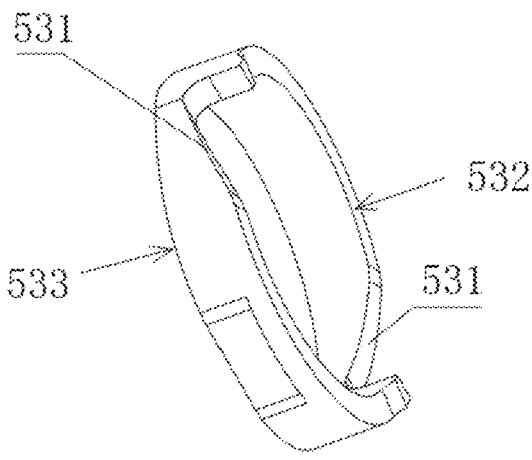
FIG. 9 is a schematic diagram of a sleeve ring.

As shown in FIG. 9, the sleeve ring 530 includes a first end face 532 and a second end face 533, and the first end face 532 and the second end face 533 are disposed at two axial ends of the sleeve ring 530 respectively. The first end face 532 is farther from the line spooler 100 than the second end face 533.

The guide structure 531 includes a guide surface, and the guide surface abuts against the pin shaft 523. In the axial direction of the mounting shaft 210, a distance between the guide surface and the line spooler 100 gradually increases from a proximal end to a distal end of the guide surface, where the proximal end of the guide surface is connected to the first end face 532.

Figure 10:
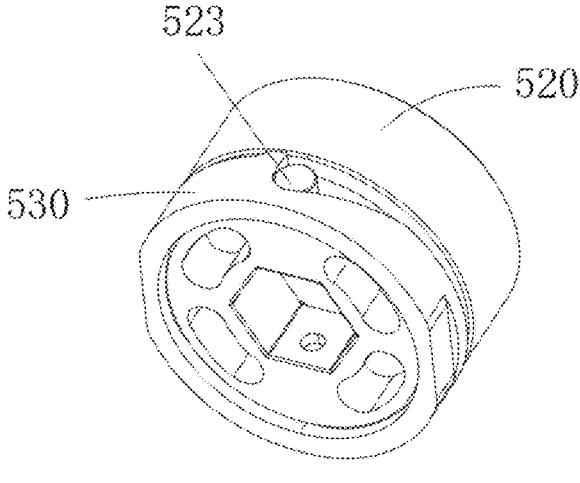
FIG. 10 is a schematic diagram of connection between a sleeve ring and a base.
Figure 11:
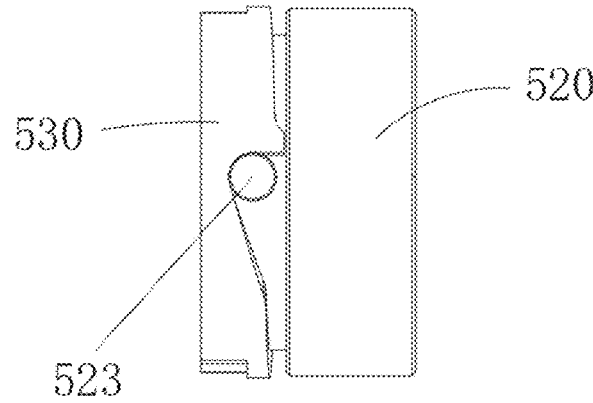
FIG. 11 is a top view of FIG. 10.

With reference to FIGS. 2, 10, and 11, in an initial state, the pin shaft 523 abuts against the distal end of the guide surface, and in this case, the linkage device 200 is decoupled from the line spooler 100. When the shift lever 510 is toggled to rotate in an arrow direction (according to an orientation shown in FIG. 2, the shift lever 510 rotates upward), the shift lever 510 drives the sleeve ring 530 to rotate synchronously, and as the sleeve ring 530 rotates, the guide surface drives the pin shaft 523 to translate to a side away from the line spooler 100; since the pin shaft 523 is fixedly connected to the base 520, the pin shaft 523 drives the base 520 to move synchronously during translation, and at the same time, the base 520 slides relative to the housing 10 of the fishing reel; and since one end of the mounting shaft 210 is connected to the base 520, when the base 520 displaces relative to the housing 10, the base 520 also drives the mounting shaft 210 to move, such that the mounting shaft 210 displaces relative to the housing 10, and the mounting shaft 210 moves relative to the line spooler 100, thereby achieving the coupling between the linkage device 200 and the line spooler 100. As the pin shaft 523 continuously approaches the proximal end of the guide surface, the normal force between the first driven friction member 220 and the first fixed friction member 111, and the normal force between the second driven friction member 230 and the second fixed friction member 121 both continuously increase.

In this embodiment, the adjustment device 500 further includes a knob 540. The knob 540 is threadedly connected to the base 520. A fixed bearing 550 is disposed within the knob 540, and an inner ring of the fixed bearing 550 is fixedly connected to the mounting shaft 210. The housing sleeve 511, the base 520, the sleeve ring 530, the fixed bearing 550, and the mounting shaft 210 are all coaxially arranged.

Further, the knob 540 is provided with an end cover 541, and the end cover 541 may be mounted on the knob 540 through snap-fit connection, threaded connection, or the like. The end cover 541 covers an opening on a side surface of the knob 540 and plays a role in protecting the fixed bearing 550 and the like.

Since the knob 540 is threadedly connected to the base 520, when the knob 540 rotates relative to the base 520, a distance between the knob 540 and the line spooler 100 increases or decreases in the axial direction of the mounting shaft 210; accordingly, the fixed bearing 550 fixed in the knob 540 displaces to a certain extent, which drives the mounting shaft 210 to move, so as to adjust a position of the mounting shaft 210, change a relative positional relationship between the mounting shaft 210 and the line spooler 100, and adjust the normal force between the first driven friction member 220 and the first fixed friction member 111, and the normal force between the second driven friction member 230 and the second fixed friction member 121. It can be seen that the normal force may be finely adjusted by rotating the knob 540, such that a corresponding friction may be finely adjusted.

Figure 12:
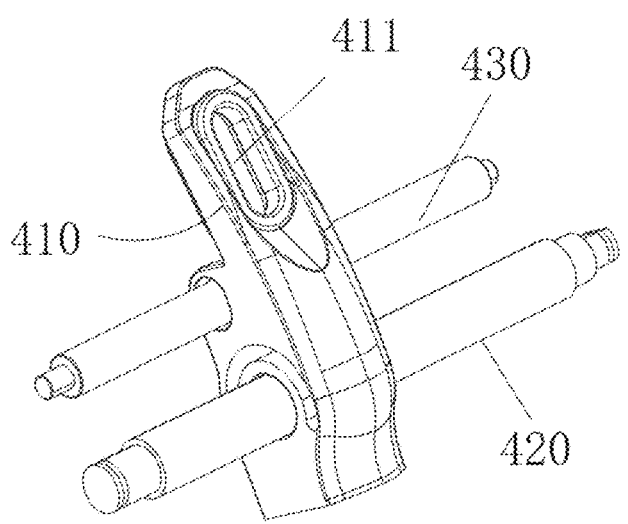
FIG. 12 is a first schematic diagram of a guide shaft, a leading shaft, and a line guide in an assembled state.
Figure 13:
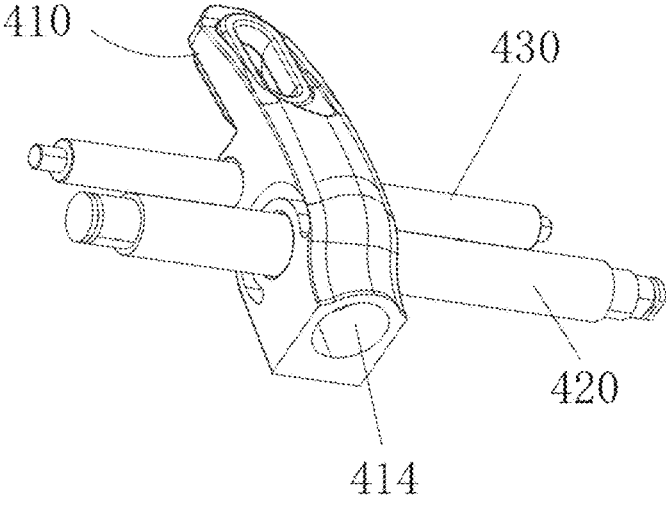
FIG. 13 is a second schematic diagram of FIG. 12.
Figure 14:
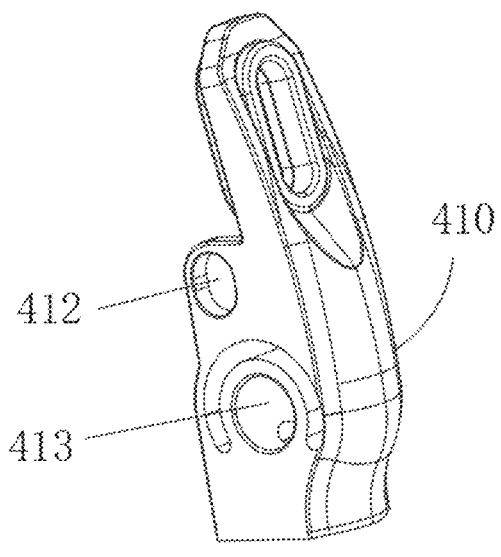
FIG. 14 is a schematic diagram of a line guide.

As shown in FIGS. 12, 13, and 14, in this embodiment, the line guide 410 is provided with a threading hole 411, and the threading hole 411 is configured to enable the fishing line to pass therethrough. The line guide 410 includes a first mounting hole 412 and a second mounting hole 413; a guide shaft 430 extends through the first mounting hole 412, and the line guide 410 is slidably connected to the first mounting hole 412; the leading shaft 420 extends through the second mounting hole 413, and the leading shaft 420 is slidably connected to the second mounting hole 413; and the guide shaft 430 and the leading shaft 420 are arranged parallel to each other. In FIGS. 12 and 13, helical grooves on the leading shaft 420 are not shown to facilitate observation.

Figure 15:
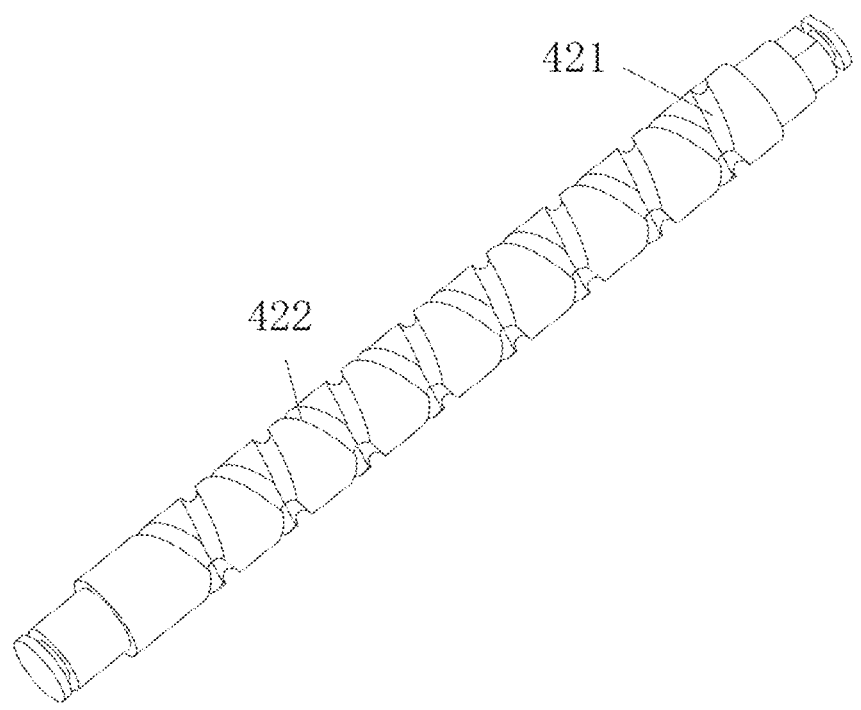
FIG. 15 is a schematic diagram of a leading shaft.

As shown in FIG. 15, the leading shaft 420 is provided with two intersecting helical grooves. Proximal ends of the two helical grooves are communicated with each other, and distal ends thereof are also communicated with each other; and all dimensional parameters of the two helical grooves are identical.

For the convenience of description, the two helical grooves are named as a first helical groove 421 and a second helical groove 422 respectively. In this embodiment, the leading shaft 420 includes a twist shaft.

The line guide 410 is provided with a pin. The pin is inserted into the helical groove. The pin is configured to slide along the helical groove when the leading shaft 420 rotates. As shown in FIG. 13, an open hole 414 is formed at a bottom of the line guide 410, and the pin is mounted in the open hole 414, where the pin and the open hole 414 may be connected through the threaded connection or any other means. The open hole 414 is communicated with the second mounting hole 413.

In an embodiment, it is assumed that the pin is initially located at a proximal end of the first helical groove 421, when the leading shaft 420 rotates, the pin translates to one end of the leading shaft 420 under the action of the first helical groove 421 and moves to a distal end of the first helical groove 421; since the distal ends of the first helical groove 421 and the second helical groove 422 are smoothly communicated, as the leading shaft 420 continues to rotate, the pin moves into the second helical groove 422, and then the pin translates to the other end of the leading shaft 420 under the action of the second helical groove 422 and moves to a proximal end of the second helical groove 422; and since the proximal ends of the first helical groove 421 and the second helical groove 422 are smoothly communicated, as the leading shaft 420 continues to rotate, the pin moves into the second helical groove 422, and then the pin translates to the other end of the leading shaft 420 under the action of the second helical groove 422 and moves back to the proximal end of the second helical groove 422.

When the leading shaft 420 rotates continuously, the above process is repeated continuously, thereby achieving a linear reciprocating motion of the pin. Since the pin is fixedly connected to the line guide 410, the pin drives the line guide 410 to perform a linear reciprocating motion, thereby achieving the linear reciprocating motion of the line guide 410.

Since the pin is fixedly connected to the line guide 410, the pin drives the line guide 410 to move synchronously, such that during the line retrieval process, the line guide 410 guides the fishing line to be uniformly wound on the line spooler 100. When a displacement of the line guide 410 on the leading shaft 420 is determined after the leading shaft 420 rotates by one circle, a length of line retrieval or release may be determined, and in this way, the length of line retrieval or release may be determined by detecting the rotation count of the leading shaft 420.

In this embodiment, the fishing reel further includes a detection module and a display module 600. The detection module and the display module 600 may be powered by a built-in power supply or an external power supply.

The detection module is configured to detect a rotational speed and/or the rotation count of the leading shaft 420. The detection module includes a rotational speed sensor and/or an encoder, and the like, where the rotational speed sensor may be configured to detect the rotational speed of the leading shaft 420, and the encoder may be configured to detect the rotation count of the leading shaft 420. When the detection module includes the encoder, a magnet corresponding to the encoder needs to be arranged on the leading shaft 420.

The display module 600 is configured to display operating parameters of the fishing reel, where the display module 600 is electrically connected to the detection module. Additionally, the display module 600 is capable of further displaying data such as videos, and for example, the display module 600 is communicatively connected to a terminal device such as an action camera, such that images captured by the action camera may be transmitted to the display module 600 to facilitate view by the user.

In this embodiment, a fishing tackle is further provided, including a fishing rod and the fishing reel mentioned above, where the fishing reel is mounted on the fishing rod.

In the description of the present specification, the description of reference terms such as "one embodiment", "some embodiments", "example", "specific example", or "some examples" means that specific features, structures, materials or characteristics described in combination with the embodiment or example are included in at least one embodiment or example of the present disclosure. In the present description, the schematic description of the above terms should not necessarily refer to the same embodiment or example. Moreover, the specific features, structures, materials or characteristics described may be combined in a suitable manner in any one or more embodiments or embodiments. Further, those skilled in the art may integrate and combine different embodiments or examples described in the present specification, as well as the features of different embodiments or examples without contradiction.

Although the embodiments of the present disclosure have been shown and described above, it should be understood that the above embodiments are exemplary and should not be construed as limiting the present disclosure, and a person skilled in the art may make changes, modifications, replacements and variations to the above embodiments within the scope of the present disclosure.

What is claimed is:

1. A fishing reel, comprising:
   a line spooler, configured to unwind or wind a fishing line;
   a linkage device, configured to be coupled to or decoupled from the line spooler;
   a drive device, configured to drive the linkage device such that the line spooler coupled to the linkage device rotates;
   a line guide, configured to enable the fishing line to pass therethrough and guide the fishing line; and
   a leading shaft, configured to guide the line guide to perform a linear reciprocating motion;
   wherein the drive device comprises a manual drive module and an electric drive module, and at least one selected from the manual drive module and the electric drive module serves as a drive source; and the leading shaft is in transmission connection with the linkage device.

2. The fishing reel according to claim 1, wherein the line spooler comprises a first mounting portion and a second mounting portion, wherein the first mounting portion is fixedly provided with a first fixed friction member, and the second mounting portion is fixedly provided with a second fixed friction member;

the linkage device comprises a mounting shaft, a first driven friction member, and a second driven friction member; the mounting shaft extends through the line spooler; and the first driven friction member and the second driven friction member are both sleeved on the mounting shaft, the first driven friction member is fixedly connected to the mounting shaft, and the second driven friction member is connected to the mounting shaft in a synchronously rotatable and slidable manner;

the first driven friction member is configured to move synchronously with the mounting shaft so as to come into contact with or disengage from the first fixed friction member; the second driven friction member is configured to come into contact with or disengage from the second fixed friction member when the line spooler moves relative to a housing of the fishing reel under the action of the linkage device;

when the linkage device and the line spooler are in a coupled state: the first driven friction member comes into contact with the first fixed friction member; or the first driven friction member comes into contact with the first fixed friction member, and the second driven friction member comes into contact with the second fixed friction member; and when the linkage device and the line spooler are in a decoupled state: the first driven friction member disengages from the first fixed friction member, and the second driven friction member disengages from the second fixed friction member.

3. The fishing reel according to claim 2, wherein the linkage device is connected to a first reset member and a second reset member; wherein the first reset member is configured to provide a first reset force so as to drive the first driven friction member to disengage from the first fixed friction member; and the second reset member is configured to provide a second reset force so as to drive the second driven friction member to disengage from the second fixed friction member.

4. The fishing reel according to claim 3, wherein an adjustment device is disposed on the housing of the fishing reel; the adjustment device is configured to drive the mounting shaft to translate in a preset direction, such that the linkage device is coupled to or decoupled from the line spooler; and wherein the preset direction is an axial direction of the mounting shaft.

5. The fishing reel according to claim 4, wherein the adjustment device comprises a shift lever, a base, and a sleeve ring;

a housing sleeve of the shift lever is sleeved on the sleeve ring, and the housing sleeve is connected to the sleeve ring in a synchronously rotatable manner;

the base is slidably disposed on the housing of the fishing reel, and a sliding direction of the base relative to the housing of the fishing reel is consistent with the axial direction of the mounting shaft; a boss of the base is provided with a placement hole, a pin shaft is fixedly mounted in the placement hole, and a portion of the pin shaft is located outside the placement hole; one end of the mounting shaft is connected to the base; and the sleeve ring is rotatably sleeved on the boss of the base; the sleeve ring is provided with a guide structure; and the guide structure is configured to drive the pin shaft to translate in a direction parallel to the axial direction of the mounting shaft when the sleeve ring rotates.

6. The fishing reel according to claim 5, wherein the sleeve ring comprises a first end face and a second end face, and the first end face and the second end face are disposed at two axial ends of the sleeve ring respectively; the first end face is farther from the line spooler than the second end face; and the guide structure comprises a guide surface, and the guide surface abuts against the pin shaft; and in the axial direction of the mounting shaft, a distance between the guide surface and the line spooler gradually increases from a proximal end to a distal end of the guide surface, wherein the proximal end of the guide surface is connected to the first end face.

7. The fishing reel according to claim 5, wherein the adjustment device further comprises a knob, and the knob is threadedly connected to the base; a fixed bearing is disposed within the knob, and an inner ring of the fixed bearing is fixedly connected to the mounting shaft; and the housing sleeve, the base, the sleeve ring, the fixed bearing, and the mounting shaft are all coaxially arranged.

8. The fishing reel according to claim 1, wherein the line guide is provided with a threading hole, and the threading hole is configured to enable the fishing line to pass therethrough;

the line guide comprises a first mounting hole and a second mounting hole; a guide shaft extends through the first mounting hole, and the line guide is slidably connected to the first mounting hole; the leading shaft extends through the second mounting hole, and the leading shaft is slidably connected to the second mounting hole; and the guide shaft and the leading shaft are arranged parallel to each other;

the leading shaft is provided with two intersecting helical grooves; proximal ends of the two helical grooves are communicated with each other, and distal ends thereof are also communicated with each other; and the line guide is provided with a pin; the pin is inserted into the helical groove; and the pin is configured to slide along the helical groove when the leading shaft rotates.

9. The fishing reel according to claim 1, further comprising a detection module and a display module;

wherein the detection module is configured to detect a rotational speed and/or a rotation count of the leading shaft; and the display module is configured to display operating parameters of the fishing reel, wherein the display module is electrically connected to the detection module.

10. A fishing tackle, comprising a fishing rod and the fishing reel according to claim 1, wherein the fishing reel is mounted on the fishing rod.

* * * * *